Sept. 25, 1934.        L. ANDREN        1,974,732
WELDING ELECTRODE AND COATING THEREFOR
Filed Feb. 25, 1932        3 Sheets-Sheet 1
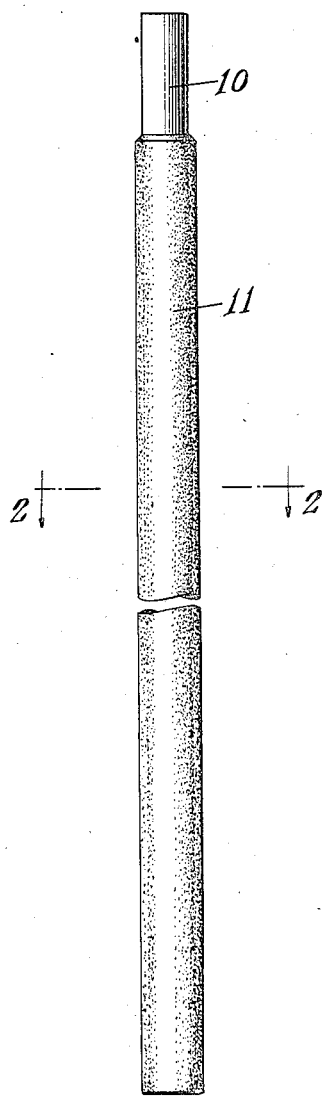
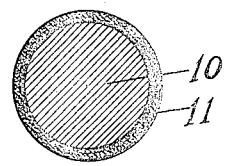
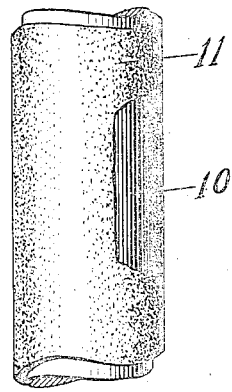
INVENTOR
Lennart Andren
BY
Watson, Bristol, Johnson & Leavenworth
ATTORNEYS Sept. 25, 1934.   L. ANDREN   1,974,732
WELDING ELECTRODE AND COATING THEREFOR
Filed Feb. 25, 1932   3 Sheets-Sheet 2

Inventor
Lennart Andren
By Watson, Bristol, Johnson & Leavenworth
Attorneys

Patented Sept. 25, 1934

1,974,732

UNITED STATES PATENT OFFICE

1,974,732

WELDING ELECTRODE AND COATING THEREFOR

Lennart Andren, Bridgeport, Conn., assignor to American Chain Co., Inc., Bridgeport, Conn., a corporation of New York Application February 25, 1932, Serial No. 595,025

17 Claims. (Cl. 219—8)

This invention relates to welding electrodes and to welded joints produced therewith and, more particularly, welding electrodes provided with a coating adapted to insure certain characteristics of the welded joints produced therewith.

General objects of the invention are the provisions of such electrodes which operate practically noiselessly with substantially no sputtering, very little smoke and offensive odor and a small arc flame, and which will provide welds having a high degree of ductility, a high tensile strength, deep penetration and which are substantially free from blow holes or porosity, of uniform grain structure substantially free from nitrogen, oxygen and other impurities such as bodies of slag, quickly and readily formed, have little tendency to spread while being formed, smooth and attractive in appearance after formation and readily freed from a surface slag; and welds of the character set forth above.

A more specific object of the invention is the provision of such electrodes, the coating of which adheres tenaciously to the electrodes and will not readily break or peel off when the electrodes are deformed or jarred, melts off during welding a little slower than does the metal of the electrode to provide a shielding crater for the arc and a protecting sleeve for the molten metal being deposited, does not interfere with the deposition of the metal, forms an efficient protective coating over the bead readily removable therefrom and insures a high recovery and desired percentages of manganese, molybdenum and carbon in the weld.

Another object of the invention is the provision of such electrodes, the coating of which contains manganese preferably in the form of ferromanganese, molybdenum preferably in the form of ferromolybdenum, and a deoxidizer preferably calcium silicide or the material known to the trade as "calcium boride".

An additional object of the invention is the provision of welds having uniform grain structures substantially free from porosity, blow holes, impurities and slag, a sufficient ductility, a tensile strength of greater than 58,000 pounds per square inch, and which are capable of being improved by heat treatment; the grain structure being refined by molybdenum, preferably in an amount less than 1 per cent by weight; strength, toughness, durability and other physical properties being insured by the presence of more than 0.5 per cent by weight of manganese and more than 0.05 per cent by weight of carbon.

Other objects of the invention will in part be obvious and will in part appear hereinafter.

The invention accordingly comprises articles of manufacture possessing the features, properties, and relation of constituents, and the composition possessing the characteristics, properties and relation of constituents, which are exemplified in the following detailed disclosure, and the scope of the application of which will be indicated in the claims.

For a fuller understanding of the nature and objects of the invention reference should be had to the following detailed description taken in connection with the accompanying drawings, in which:

Fig. 1 is an elevational view of a welding electrode formed as a metallic rod provided with a coating or covering in accordance with the present invention;

Fig. 2 is an enlarged transverse sectional view on line 2—2 of Fig. 1;

Fig 3 is an enlarged elevational view of a portion of the welding electrode of Fig. 1 with a portion of the covering or coating broken away;

Figure 4:
Fig. 4 illustrates a portion of a steel welded joint produced by a bare electrode of low carbon steel of ordinary electrode analysis magnified 100 diameters.
Figure 5:
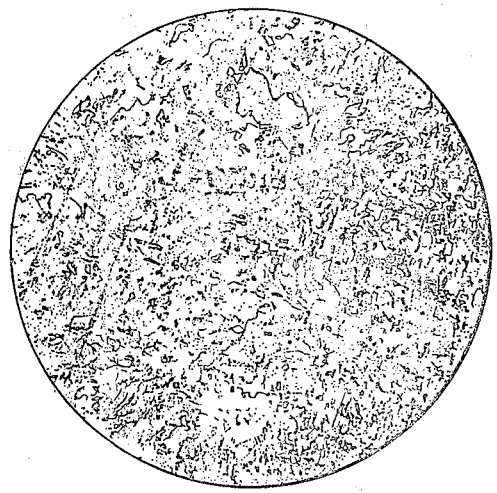
Fig. 5 illustrates a portion of a welded joint produced by a bare electrode of ordinary electrode analysis but which includes in addition a small amount of molybdenum, magnified 100 diameters.
Figure 7:
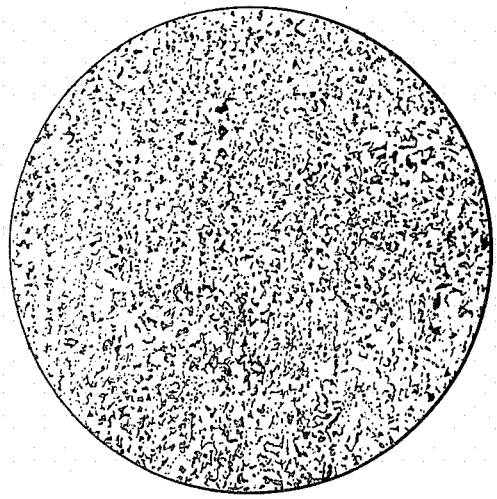
Figure 6:
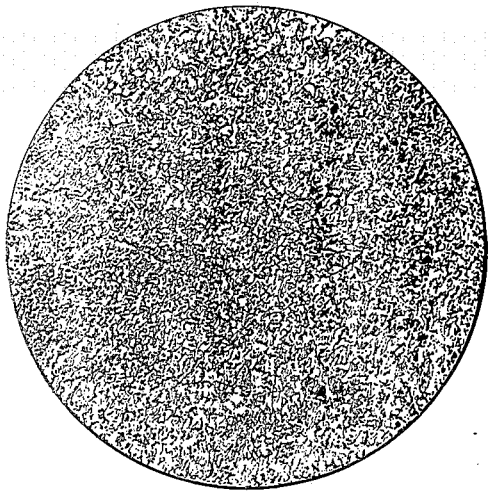

Fig. 6 illustrates a portion of a welded joint produced by an electrode of the present invention, magnified 100 diameters; and Fig. 7 illustrates a portion of the structure of the base metal upon which the welded joints depicted in Figs. 4, 5 and 6 were formed, magnified 100 diameters.

The electrodes of the prior art which have proven most satisfactory have required reverse polarity, thus limiting the possible penetration of the deposited metal in the base metal, and producing welded joints the metal of which in a molten state spreads to a large degree, having blow holes, a high degree of porosity, and impurities in the nature of nitrogen, oxygen and small bodies of slag, an undesirable low degree of ductility and tensile strength; and which in operation are noisy and evidence a tendency to sputter and give off a large quantity of smoke, deposit metal rather non-uniformly and form a slag coating on the welded joints which is difficult to remove. These and many other difficulties of the prior art are eliminated by the coated electrode of the present invention which may be used to obtain much better welds than have heretofore been obtainable and which performs its operations in an efficient and satisfactory manner.

In the art of welding whereby a low carbon steel is deposited by means of the metallic arc, it has been found that the physical properties of these welded joints are deficient in many respects. They are not very ductile and their strength is not usually equal to that of the base metal. It is well recognized that the reason for this is the coarseness of the structure of the welded joint and the composition of the weld metal which is not the same as that of the electrode from which the metal is deposited. This applies to the type of welding electrodes known as "bare" electrodes. It has been found to be unavoidable that considerable amounts of carbon and manganese, which elements are normally present in the electrodes, are oxidized in the welding process and thus are not recovered in the weld. For example, an electrode of ordinary electrode analysis containing 0.12 to 0.18 per cent of carbon and 0.40 to 0.60 per cent of manganese by weight normally produces welded joints of not more than about 0.05 per cent by weight of carbon and not more than about 0.15 per cent by weight of manganese.

In order to recover more of these elements in the welded joints, that is to prevent the loss of them in the welding process, resort has been had to coating the electrodes. While such coatings preserve much more of the carbon and manganese, thus making their recovery in welded joints much greater than if electrodes are used of the so-called "bare" type, the grain structure of the welded joints remains rather coarse and non-uniform having poor ductility and low tensile strength.

In accordance with the present invention it has been found that a very uniform, fine grain structure of the welded joint can be had by the introduction of molybdenum in the deposited metal. The incorporation of molybdenum in the coating has been found to be not only very advantageous but in certain cases essential, and less molybdenum is lost if this element is incorporated in the coating. In accordance with the present invention the molybdenum can be present in the coating in the form of metallic molybdenum itself, or of an alloy with other metals, such as ferromolybdenum, or may be in the form of some molybdenum compounds, such as calcium molybdate. When incorporated in the coating the recovery in the welded joint has been found to be 75 per cent or higher.

In depositing various metals by means of an arc, particularly when bare electrodes are used, the majority of the normal constituents, manganese and silicon, are oxidized in the electrodes, manganese and silicon, are oxidized by the air surrounding the arc and thus do not enter the deposited metal or welded joints, such joints often displaying a high degree of porosity and blow holes as a result. Heavy slag coatings for electrodes have been found to partially eliminate this difficulty by providing protective sleeves around the arcs, thus insuring greater recovery of manganese and silicon in the deposited metal although the percentages of these elements therein never reach those of the electrode. When, however, such heavy coatings are employed the constituents thereof have frequently been found to cause chemical reactions with each other and with the metallic constituents of the welding electrodes, usually resulting in the production of gaseous products and/or bodies of impurities in the deposited metal, thus producing porous and imperfectly welded joints.

In accordance with the present invention it has been found that certain materials having strong affinity for oxygen and nitrogen can be incorporated in the coating with very great advantages. These materials protect the metallic constituents of the electrode so that the latter, particularly manganese, silicon and carbon, are preserved during the welding process, thus increasing the recovery of these elements in the welded joints. The present invention contemplates the use of borides and silicides and more particularly a material known to the trade as "calcium boride", and so referred to throughout the specification and claims and calcium silicide as the constituents for this purpose and are referred to in the claims as "deoxidizing constituents". The products of oxidation of borides and silicides have in general a low melting point and are thus easily fused. In addition they readily combine with other elements in the coating to form slags of low melting point which during the process of welding float upon the top of the molten metal.

It is desirable to have the welded joint possess great strength and ductility. Experimentation has shown that very excellent welded joints having a high degree of ductility and tensile strength are produced when the deposited metal contains certain percentages of manganese and molybdenum, as, for example, 1 to 1.5 per cent by weight of manganese and about 0.15 to 0.25 per cent by weight of molybdenum. This invention contemplates the provision of welded joints wherein the deposited metal contains manganese in an amount greater than 0.5 per cent, such as, for example, about 1 per cent by weight; molybdenum in an amount less than 1 per cent by weight, such as, for example, between about 0.15 per cent and 0.25 per cent by weight, and carbon in an amount between about 0.05 per cent and 0.15 per cent by weight. These constituents in the preferred percentages can be insured in the welded joint by the incorporation in welding electrode coatings of proper amounts of materials constituting suitable sources of these constituents and adapted to insure a high recovery thereof in the deposited metal.

Welding electrodes of the present invention are preferably formed in the shape of rods, about $\frac{3}{32}$ of an inch in diameter or larger, usually varying from about $\frac{1}{8}$ of an inch to $\frac{3}{8}$ of an inch in diameter, of low carbon steel of ordinary electrode analysis, usually containing about 0.12 to 0.18 per cent by weight of carbon and about 0.40 to 0.60 per cent by weight of manganese. These rods are then coated with a special composition or mixture, preferably comprising lime-iron silicate, fluor spar, ferromanganese, ferromolybdenum or calcium molybdate, calcium boride or calcium silicide, a carbon source such as bituminous coal, and adhesive binder such as vegetable or animal gum, a suitable deodorant, and sufficient water to insure a degree of plasticity which will allow ready application of the composition to the rods.

Referring to the drawings and, more particularly, to Figs. 1, 2 and 3, 10 indicates the metallic rod and 11 the coating or covering provided thereon by the application of the composition or mixture set forth above.

The preferred formula for the coating composition is as follows:

| Constituent | Parts by weight | Comminuted to about |
|---|---|---|
| Lime-iron silicate | 600 | 150 mesh. |
| Fluor spar | 220 | 150 mesh. |
| Ferromanganese | 110 | 200 mesh. |
| Ferromolybdenum | 30 | 200 mesh. |
| Calcium boride | 10 | 200 mesh. |
| Bituminous coal | 10 | 200 mesh. |
| Suitable deodorant | 20 | |
| Glue | 55 | |
| Water | 200 to 300 (or even less). | |

This coating composition when dried on the rods is smooth and black in appearance and adheres tenaciously without evidencing any tendency to peel or break off when the electrodes are bent at an angle of almost 90 degrees and bears a weight ratio of between 0.10 and 0.35 to 1 to the weight of the rod. During melting, it gives off very little smoke, the amount thereof being about the same as that evolved by bare electrodes. It burns very quietly and melts off at a rate a little slower than the metal of the rod thus providing a shielding sleeve for the arc. The slag produced is sufficiently fluid so as not to interfere with the molten metal being deposited and at the same time forms an excellent protective coating over the bead to prevent undesirable spreading and too rapid cooling thereof. Slow cooling of the deposited metal insures a high degree of ductility. The slag formed on the bead is smooth and dark brown in appearance, comes off readily when the welded joint is tapped without leaving thereon any silicate deposits or other bodies of impurities.

Such electrodes operate with straight polarity while welding electrodes of the prior art in general work with reverse polarity. Thus greater penetration in the base metal by the deposited metal is obtained, tests indicating the penetration to be about 35 per cent deeper than that obtainable with the best welding electrodes on the market. In addition straight polarity insures a better control of the deposition of the metal from the electrodes which, together with the fact that the coating forms a heavy slag covering for the bead which prevents undue spreading of the deposited metal, insures a much higher and localized bead than is obtainable with the use of other welding electrodes.

Welded joints formed by the use of these electrodes have been found to contain between about 0.6 per cent and 1.5 per cent by weight of manganese, less than 1 per cent by weight of molybdenum and between about 0.05 per cent and 0.15 per cent by weight of carbon. Such a composition of the deposited metal insures a response to heat treatments which will improve the physical properties thereof.

Further advantages obtained by the use of such welding electrodes and the formation of such welded joints will in part be obvious and in part appear in the results set forth below of the experimental tests made.

Test No. 1

The carbon and manganese content and the strength of the plates used were as follows:

| | ¼ inch | ⅜ inch | ½ inch |
|---|---|---|---|
| Carbon | 0.14% | 0.14% | 0.22% |
| Manganese | 0.28% | 0.38% | 0.34% |
| Tensile strength pounds per square inch | 63,600 | 56,100 | 62,100 |

The ¼ inch plate was welded with 5/32 inch coated electrodes of the present invention and the formation of one bead, and the ⅜ inch and ½ inch plates were welded with 5/32 inch coated electrodes of the present invention and the formation of two beads. The test specimens were notched at the weld so as to promote a break therein, the width of the notch being a function of the thickness of the plate and the width of the welded joint. The break was expected to occur in the welded joint and the test was intended to determine the strength of the welded joint proper. The specimens were then placed in a machine adapted to apply an increasing pull upon the specimens until they were broken. The results of the test were as follows:

| Plate | Tensile strength lbs. per sq. in. | Remarks |
|---|---|---|
| ¼ inch | 68,250 | Broke in base metal adjacent to weld. |
| ¼ inch | 71,110 | Do. |
| ¼ inch | 70,950 | Do. |
| ⅜ inch | 65,160 | Broke in weld. |
| ⅜ inch | 63,690 | Do. |
| ⅜ inch | 60,730 | Do. |
| ½ inch | 59,110 | Do. |
| ½ inch | 61,470 | Broke in base metal. |
| ½ inch | 61,460 | Do. |

Test No. 2

Tests were made on a bar formed entirely from metal deposited from coated electrodes of the present invention. This bar showed a tensile strength of 76,500 pounds per square inch. Analysis of this bar showed:

Per cent
Carbon ---------------------------------- 0.13
Manganese ------------------------------ 1.12
Molybdenum ---------------------------- 0.19

Test No. 3

Prior to the present invention it has been impossible to form welded joints with any great rapidity due to the fact that the metal becomes overheated and the welded joints produced are found to be unsound and of low tensile strength and ductility and of a coarse grain structure. The usual procedure on plates of a thickness in excess of ¼ inch is the formation of two beads or more, each of which is slowly and carefully formed. However, due to the very advantageous grain refinement found in the welded joint produced in accordance with the present invention, it was considered possible to speed up the welding operation by using large diameter coated electrodes and depositing higher beads. The deposition of higher beads is made possible by the efficient covering of the deposited metal with a thick slag coating which prevents undue spreading of the molten metal. The molybdenum content was depended upon to keep the grain size down to a minimum even under conditions of overheating. ⅜ inch plate bevelled to 90 degrees was welded with a coated electrode, the rod diameter of which was ¼ inch, and the weld was made in one operation, that is, only one bead was deposited. Test specimens were prepared by forming notches at the welded joints about 4 inches in width. The test showed the following results:

| Specimen No. | Tensile strength | Remarks |
| --- | --- | --- |
| 1 | 66,050 | Broke in base. |
| 2 | 64,410 | Do. |

Test No. 4

In tests for ductility and elongation, narrow specimens were cut from the welded plates so that each included a section of the welded joint. These specimens were bent freely until failure was indicated in the specimens. It was found in the tests that the welds refused to bend as much as the adjacent base metal due to a difference in strength. The welded joints did not show any signs of failure although they opened up in the bond area due to the very sharp bends in the base metal at these points. An attempt was made to use the bending extensometer which measures the radius of the bend over a short distance and is calibrated directly in per cent elongation. By this method values of from 26 per cent to 43 per cent were obtained which represent local elongation over distances of $\frac{3}{16}$ inch. These results when compared with the best results obtainable with the use of the best electrodes of the prior art show a surprising superiority of the present welded joints with regard to ductility.

Test No. 5

Three welding rods were selected for this test and designated respectively 1, 2 and 3.

No. 1 was a bare rod of low carbon steel of ordinary electrode analysis;

No. 2 was a bare rod similar to No. 1 but in which was included molybdenum;

No. 3 was a bare rod similar to No. 1 but coated with the coating composition disclosed above.

The analysis of the metal in these rods showed:

| | No. 1 | No. 2 | No. 3 |
| --- | --- | --- | --- |
| Carbon | 0.15% | 0.10% | 0.14% |
| Manganese | 0.44 | 0.38 | 0.42 |
| Molybdenum | | 0.27 | |

With these electrodes three plates were welded up, these being ½ inch thick and of ordinary boiler plate composition. The procedure of welding and the dimensions of the plates were such as are commonly employed in tests of this kind.

The plates were machined into tensile test specimens so that three specimens were obtained from each plate. The values below are averages of the values from each group of the three specimens:

| Welded with rod | Tensile strength per sq. in. of weld |
| --- | --- |
| No. 1 | 50,190 lbs. |
| No. 2 | 52,980 " |
| No. 3 | 58,800 " |

Chemical analysis of the weld metal was made. The samples for analysis were taken from the above mentioned plates, care being taken not to get any of the base metal into the sample.

The analysis showed the following:

| Weld metal from rod | Carbon | Manganese | Molybdenum |
| --- | --- | --- | --- |
| | Percent | Percent | Percent |
| No. 1 | 0.02 | 0.12 | ---- |
| No. 2 | 0.02 | 0.12 | 0.23 |
| No. 3 | 0.07 | 0.64 | 0.13 |

From this it can be seen that the coating preserves more of the carbon in the deposited metal and also adds manganese. The molybdenum content in the coating was computed to be 0.17 per cent of the welding rod metal. The 0.13 per cent molybdenum obtained in the weld shows a 77 per cent recovery.

A microscopic study of the welded joints was made, Fig. 4 illustrating a portion of the welded joint produced by electrode No. 1, Fig. 5 illustrating a portion of the welded joint produced by electrode No. 2, Fig. 6 illustrating a portion of the welded joint produced by electrode No. 3 and Fig. 7 illustrating a portion of the structure of the base metal upon which these welded joints were formed. The portions illustrated in Figs. 4, 5 and 6 were taken at points approximately in the center of the welded joint. These studies indicate that welded joints formed with the use of welding electrodes of the present invention are far more fine grained than the other welded joints and resemble in many respects the adjacent base metal. These welded joints are found to be substantially free from oxygen and nitrogen, two constituents which have deleterious effects upon the strength of the welded joints, the percentages present being far less than that present in the best welded joints producible prior to the present invention.

The relative proportions of the various constituents of the coating composition or mixture and those of the constituents contained in the welded joints produced, set forth above, though preferred are not to be taken in a limiting sense since these proportions may vary within certain limits without departing from the scope of the invention.

In the coating composition the manganese bearing constituent may vary between about two per cent and fifteen per cent by weight, the molybdenum bearing constituent may vary between about one per cent and five per cent by weight and the deoxidizer may vary between about one half per cent and three per cent by weight.

In the welded joints the manganese content should be greater than 0.5 per cent by weight and may conveniently vary between about 0.6 per cent and 1.5 per cent by weight; the molybdenum content should be less than 1 per cent by weight and may conveniently vary between about 0.10 per cent and 0.40 per cent by weight; and the carbon content should be greater than 0.05 per cent by weight and may conveniently vary between about 0.05 per cent and 0.25 per cent by weight.

Since certain changes may be made in the above articles and certain modifications in the compositions which embody the invention and different embodiments of the invention may be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A welding electrode comprising a mild steel rod having a coating including a manganese source containing manganese in an amount by weight between about 1.5 per cent and about 12 per cent, a molybdenum source containing molybdenum in an amount by weight between about .5 per cent and about 3 per cent, and a carbon source for alloying between about .6 per cent and 1.5 per cent by weight of manganese, between about .1 per cent and .4 per cent by weight of molybdenum and between about .05 per cent and .25 per cent by weight of carbon in the deposited metal, and a slag forming constituent.

2. A welding electrode comprising a mild steel rod having a coating including a manganese source containing manganese in an amount by weight between about 1.5 per cent and about 12 per cent, a molybdenum source containing molybdenum in an amount by weight between about .5 per cent and about 3 per cent, and a carbon source for alloying between about .6 per cent and 1.5 per cent by weight of manganese, between about .1 per cent and .4 per cent by weight of molybdenum and between about .05 per cent and .25 per cent by weight of carbon in the deposited metal, between about .5 per cent and 3 per cent by weight of a deoxidizing constituent, with the major part of the coating composition consisting of a slag forming constituent.

3. A welding electrode comprising a rod having a coating containing as the metallic constituents between about .5 per cent and about 3 per cent by weight of molybdenum and between about 1.5 per cent and about 12 per cent by weight of manganese, and between about .5 per cent and 3 per cent by weight of a deoxidizer.

4. A welding electrode comprising a metallic rod having a coating containing not more than about 3 per cent by weight of molybdenum, not more than about 12 per cent by weight of manganese, and a deoxidizer comprising one or more of the substances calcium boride and calcium silicide.

5. A welding electrode comprising a metallic rod having a coating containing about 2 per cent by weight of molybdenum, about .8 per cent by weight of manganese and not more than about 3 per cent by weight of one of the deoxidizers calcium boride and calcium silicide.

6. A welding electrode comprising a metallic rod having a coating containing between about 2 per cent and 15 per cent by weight of ferromanganese, between about .5 per cent and 3 per cent by weight of calcium boride and between about 1 per cent and 5 per cent by weight of one of the substances calcium molybdate and ferromolybdenum.

7. A welding electrode comprising a metallic rod having a coating containing not more than about 15 per cent by weight of ferromanganese, not more than about 5 per cent by weight of ferromolybdenum and not more than about 3 per cent by weight of calcium boride.

8. A welding electrode comprising a metallic rod having a coating including lime-iron silicate, fluor spar, coal, an adhesive binder, ferromanganese, one of the substances calcium molybdate and ferromolybdenum and one of the deoxidizers calcium silicide and calcium boride, said lime-iron silicate and said fluor spar comprising between about 60 per cent and 85 per cent by weight of said coating and said other constituents together constituting chiefly the remainder.

9. A welding electrode comprising a metallic rod having a coating consisting of a mixture of lime-iron silicate, fluor spar, ferromanganese, ferromolybdenum, calcium boride, coal and glue, with the lime-iron silicate and fluor spar taken together constituting between about 60 per cent and 85 per cent by weight of the mixture.

10. A welding electrode comprising a metallic rod having a coating consisting of between about 60 per cent and 85 per cent by weight lime-iron silicate and fluor spar and a remainder, said remainder comprising ferromanganese, ferromolybdenum, calcium boride, coal, glue and a deodorant.

11. A welding electrode comprising a metallic rod having a coating consisting of between about 60 per cent and 85 per cent by weight lime-iron silicate and fluor spar and a remainder, said remainder comprising about 48 per cent by weight of ferromanganese, about 13 per cent by weight of ferromolybdenum, about 4 per cent by weight of calcium boride, about 4 per cent by weight of bituminous coal, about 23 per cent by weight of glue and about 9 per cent by weight of a suitable deodorant.

12. A coating composition for welding electrodes comprising lime-iron silicate, fluor spar, coal, a binder, a deodorant, ferromanganese in an amount between about 2 per cent and 15 per cent by weight, ferromolybdenum in an amount between about 1 per cent and 5 per cent by weight and calcium boride in an amount between about .5 per cent and 3 per cent by weight.

13. A coating composition for welding electrodes comprising about 600 parts by weight of lime-iron silicate, about 220 parts by weight of fluor spar, about 110 parts by weight of ferromanganese, about 30 parts by weight of ferromolybdenum, about 10 parts by weight of calcium boride, about 10 parts by weight of bituminous coal, about 55 parts by weight of glue and water in an amount sufficient to insure a degree of plasticity of the mixture allowing ready application thereof to welding electrodes.

14. A straight polarity welding electrode comprising a steel rod of a diameter between about ⅛ of an inch and ⅜ of an inch having a relatively heavy coating bearing a weight ratio of between .10 and .35 to 1 to the weight of the rod and containing between about 1 per cent and 5 per cent by weight of ferromolybdenum, between about 2 per cent and 15 per cent by weight of ferromanganese and between about .5 per cent and 3 per cent by weight of one of the deoxidizers calcium silicide and calcium boride.

15. A straight polarity welding electrode comprising a steel rod of a diameter between about ⅛ of an inch and ⅜ of an inch having a relatively heavy coating bearing a weight ratio of between .10 and .35 to 1 to the weight of the rod and containing lime-iron silicate, fluor spar, ferromanganese, ferromolybdenum, calcium boride, coal, and adhesive binder, said lime-iron silicate and said fluor spar taken together constituting between about 60 per cent and 85 per cent by weight of said coating.

16. A straight polarity welding electrode comprising a steel rod of a diameter between about ⅛ of an inch and ⅜ of an inch having a relatively heavy coating bearing a weight ratio of between .10 and .35 to 1 to the weight of the rod and containing lime-iron silicate, fluor spar, ferromanganese, ferromolybdenum, calcium boride, coal, and adhesive binder, the ferromanganese, ferromolybdenum and coal being present in amounts sufficient to deposit in a weld between about .6 per cent and 1.5 per cent by weight of manganese, between about .1 per cent and .4 per cent by weight of molybdenum and between about .05 per cent and .25 per cent by weight of carbon and the slag constituents being related in a manner to insure complete removal of the slag from the surface of a weld by tapping.

17. A welding electrode adapted for use with straight polarity, reversed polarity or with alternating current, comprising a steel rod of the diameter between about ⅛ of an inch and ⅜ of an inch having a relatively heavy coating bearing a weight ratio of between .10 and .35 to 1 to the weight of the rod and containing between about 1 per cent and 5 per cent by weight of ferromolybdenum, between about 2 per cent and 15 per cent by weight of ferromanganese and between about .5 per cent and 3 per cent by weight of calcium boride.

LENNART ANDREN.